(12) United States Patent
Aranzadi De Miguel et al.

(10) Patent No.: US 9,624,687 B2
(45) Date of Patent: Apr. 18, 2017

(54) METHOD FOR THE ASSEMBLY OF FRUSTOCONICAL CONCRETE TOWERS AND CONCRETE TOWER ASSEMBLED USING SAID METHOD

(71) Applicant: Acciona Windpower, S.A., Navarra (ES)

(72) Inventors: Paula Aranzadi De Miguel, Navarra (ES); Teresa Arlaban Gabeiras, Navarra (ES); Javier Martin Diaz, Navarra (ES); Ivan Garcia Maestre, Navarra (ES); Inaki Etxandi Irungarai, Navarra (ES); Ander Gaston Lujambio, Navarro (ES); Jose Luis Aristegui Lantero, Navarra (ES); Enrique Soroa Sisamon, Navarra (ES); Jose Miguel Garcia Sayes, Navarra (ES); Miguel Nunez Polo, Navarra (ES)

(73) Assignee: Acciona Windpower, S.A. (ES)

( * ) Notice: Subject to any disclaimer, the term of this patent is extended or adjusted under 35 U.S.C. 154(b) by 0 days.

(21) Appl. No.: 14/576,631

(22) Filed: Dec. 19, 2014

(65) Prior Publication Data
US 2015/0176299 A1    Jun. 25, 2015

(30) Foreign Application Priority Data
Dec. 20, 2013  (ES) .................................. 201331892

(51) Int. Cl.
*E04H 12/34*    (2006.01)
*E04H 12/12*    (2006.01)

(52) U.S. Cl.
CPC ........... *E04H 12/342* (2013.01); *E04H 12/12* (2013.01); *Y02E 10/728* (2013.01)

(58) Field of Classification Search
None
See application file for complete search history.

(56) References Cited

U.S. PATENT DOCUMENTS

| | | | | |
|---|---|---|---|---|
| 2,958,983 A | * | 11/1960 | Hoover | E04H 7/28 52/192 |
| 3,958,381 A | * | 5/1976 | Meyer | E04H 12/12 52/1 |
| 4,406,094 A | * | 9/1983 | Hempel | E02D 27/42 416/11 |
| 6,532,700 B1 | * | 3/2003 | Maliszewski | E04H 12/085 174/45 R |
| 6,715,243 B1 | * | 4/2004 | Fons | E04H 7/30 220/4.12 |
| 7,343,718 B2 | * | 3/2008 | Foust | E04C 3/32 264/228 |
| 7,765,766 B2 | | 8/2010 | Gomez et al. | |

(Continued)

*Primary Examiner* — Babajide Demuren
(74) *Attorney, Agent, or Firm* — Hayes Soloway PC

(57) ABSTRACT

The present invention relates to a method for the assembly of frustoconical concrete towers comprising a step of placing and positioning of at least one subset of a tower section formed by at least two segments in an area close to the base of the tower, a step of assembling the subset of the tower section by attaching at least two segments, so that the assembled subset is freestanding and a step of stacking the assembled subset onto an immediately lower tower section.

20 Claims, 8 Drawing Sheets

(56) References Cited

U.S. PATENT DOCUMENTS

| | | | | |
|---|---|---|---|---|
| 8,104,242 B1* | 1/2012 | Fouad | E04C 3/34 | 52/223.14 |
| 8,499,455 B2* | 8/2013 | Suh | B66C 11/12 | 212/227 |
| 8,511,013 B2* | 8/2013 | Voss | E04C 5/07 | 52/223.5 |
| 8,555,600 B2* | 10/2013 | Cortina-Cordero | E04H 12/16 | 52/123.1 |
| 8,720,161 B2* | 5/2014 | Herrius ee Roest | E04H 12/185 | 52/223.5 |
| 8,881,485 B2* | 11/2014 | Sritharan | F03D 11/04 | 52/651.01 |
| 9,016,012 B1* | 4/2015 | Sritharan | E04H 12/10 | 52/223.6 |
| 2005/0072067 A1* | 4/2005 | Wobben | E02D 27/42 | 52/155 |
| 2005/0166521 A1* | 8/2005 | Silber | E04H 12/10 | 52/633 |
| 2006/0156681 A1* | 7/2006 | Fernandez Gomez | E04H 12/02 | 52/837 |
| 2006/0213145 A1* | 9/2006 | Haller | E04H 12/34 | 52/651.01 |
| 2006/0272244 A1* | 12/2006 | Jensen | E04H 12/085 | 52/223.5 |
| 2007/0056801 A1* | 3/2007 | Iversen | F03D 1/003 | 182/141 |
| 2008/0040983 A1* | 2/2008 | Fernandez Gomez | E04H 12/12 | 52/40 |
| 2008/0209842 A1* | 9/2008 | Montaner | E04H 12/12 | 52/651.07 |
| 2009/0019816 A1* | 1/2009 | Lockwood | E04H 12/02 | 52/848 |
| 2009/0021019 A1* | 1/2009 | Thomsen | E04H 12/085 | 290/55 |
| 2009/0102743 A1* | 4/2009 | Hager | H01Q 1/1242 | 343/890 |
| 2009/0169393 A1* | 7/2009 | Bagepalli | E04H 12/08 | 416/248 |
| 2009/0307998 A1* | 12/2009 | Zavitz | E04H 12/12 | 52/152 |
| 2009/0313913 A1* | 12/2009 | Malheiro De Aragao | E04H 12/12 | 52/40 |
| 2010/0132299 A1* | 6/2010 | Sathian | F03D 1/001 | 52/651.01 |
| 2010/0186342 A1* | 7/2010 | Ollgaard | E04H 12/085 | 52/745.17 |
| 2010/0281818 A1* | 11/2010 | Southworth | E02D 27/42 | 52/745.17 |
| 2010/0319276 A1* | 12/2010 | Kryger | E04H 12/085 | 52/173.1 |
| 2011/0056151 A1* | 3/2011 | Marmo | E02D 27/42 | 52/167.4 |
| 2011/0113708 A1* | 5/2011 | Skjaerbaek | E04C 5/125 | 52/223.1 |
| 2011/0219711 A1* | 9/2011 | Bagepalli | E04H 12/003 | 52/204.1 |
| 2011/0239564 A1* | 10/2011 | Zheng | B29C 70/086 | 52/231 |
| 2011/0271634 A1* | 11/2011 | Rasmussen | F03D 1/001 | 52/651.02 |
| 2012/0141295 A1* | 6/2012 | Martinez De Castaneda | E04H 12/085 | 416/244 R |
| 2012/0151864 A1* | 6/2012 | Willis | E04H 12/08 | 52/578 |
| 2013/0001954 A1* | 1/2013 | Garc A Maestre | F03D 1/001 | 290/55 |
| 2013/0091784 A1* | 4/2013 | Schmidt | E04H 12/182 | 52/115 |
| 2013/0174508 A1* | 7/2013 | Reed | E04H 12/08 | 52/655.1 |

* cited by examiner

METHOD FOR THE ASSEMBLY OF FRUSTOCONICAL CONCRETE TOWERS AND CONCRETE TOWER ASSEMBLED USING SAID METHOD

OBJECT OF THE INVENTION

The present invention relates to a method for the assembly of frustoconical concrete towers which allows the use of low-capacity cranes, wherein a substructure is generated from the union of at least two of the dowels that form each section so that said substructure is freestanding.

The invention further relates to a concrete tower assembled according the preceding method.

BACKGROUND OF THE INVENTION

In the last twenty years the rated power of wind turbines has gradually increased by enlarging the diameter of their rotors, which in turn need taller towers. The increased height may imply that the tower should essentially comprise several sections throughout its entire height, placed one on top of the other to form the tower and which are in turn transportable by road or rail. For example, to build an 100 m-high tower, 5 20 m-sections stacked on top of each other may be used, such dimensions being transportable by road and rail.

Moreover, to ensure that the towers, although higher, are equally stable and rigid, one option is to increase the transverse dimensions of the tower gradually from the top to the base of the tower. This increase may involve new problems for the transportation of the sections and a common solution is to divide them into longitudinal modules. The dimensions of the longitudinal modules allow their transport by road or rail.

Logically, increasing the rated power of the wind turbines leads to an increase in weight and dimensions of all wind turbine components in general, so the following aspects are particularly relevant in connection with assembly costs:
Tower height;
Rotor diameter and weight of the blade-hub assembly;
Weight of nacelle and subcomponents;
Weight of tower sections.

Specifically, the weights of the full tower sections of a 3 MW wind turbine can exceed 200 t which places high requirements on assembly cranes.

The use of these cranes is expensive, first, because of availability problems entailing high daily rental costs: there is no large park of such cranes; and second, the high costs associated with their transport due to the large number of trucks required to move them. According to data shown in U.S. Pat. No. 8,011,098B2, the cost of renting a crane for tower assembly can amount to $80,000 per week, plus nearly $100,000 for transport (forty trucks or more).

Such high costs justify the pursuit of alternative means to build wind turbine towers. Various procedures that can be followed for the assembly of these towers include:
Assembling the dowels one by one onto the rest of the installed tower, which is a problem when the dowels are not freestanding. This is the procedure used by other ATS ("antenna tower structure") manufacturers. This process requires a large number of elevations and a complicated process for the positioning and securing of the dowels until a whole section is formed on the one below it, for the subsequent execution of the vertical joints and prior to stacking the dowels of the next section.

Pre-assembling complete sections by joining the dowels, executing vertical joints between them on the ground near the base of the tower and subsequently mounting the sections one on top of another. This procedure greatly facilitates tower assembly, as most of the operations are conducted on the ground. This is the procedure of U.S. Pat. No. 7,765,766B2. The assembly process comprises two stages:
Section preassembly stage, in which the dowels that form a section are assembled at the base of the tower and the vertical joints are executed between concrete dowels, and
A lifting and piling stage in which the already pre-assembled sections are placed one on top of another.

An object of the present invention is to provide a method of assembling concrete towers which reduces crane requirements for the first procedure, while simplifying the overall assembly process with respect to the second procedure.

Furthermore, the prior art shows that the concrete tower is often a conical section tower, particularly frustoconical to withstand the high torque in the base. Furthermore, in some tower designs dowel height is much greater than tower height. This means that when the tower is conical, the dowels are unstable when placed upright, because the horizontal projection of the centre of gravity is outside of the perimeter defined by the base of the dowel.

These drawbacks are solved with the invention described below.

DESCRIPTION OF THE INVENTION

The present invention relates to a method for the assembly frustoconical concrete towers wherein subsets of sections are assembled and stacked on the rest of the tower, the said subsets being freestanding.

The invention also relates to a concrete tower obtained with the assembly method described below and which comprises at least two stacked annular sections in turn comprising at least three dowels.

The frustoconical concrete tower assembly method comprises the following steps:
a step of placing and positioning of at least one subset of a tower section comprising at least two dowels in an area close to the base of the tower;
a step of assembling of the tower section subset by joining at least two dowels, such that the assembled subset is freestanding; and
a step of stacking of the assembled subset onto a tower section which is immediately below.

If the sections are solely formed by freestanding subsets, the preceding steps are repeated until all freestanding subsets forming all the sections of the concrete tower have been stacked.

If the sections are formed by freestanding subsets and remaining dowels to complete the section of the concrete tower, the remaining dowels also need to be stacked for each of the sections of the concrete tower.

Furthermore, to ensure adequate dimensional accuracy of the sections, the step of placing and positioning of at least one subset of a tower section comprises the following steps prior to the subset assembly step:
a step of placing all the dowels that form the tower section, one by one, in the area near the base of the tower at ground level;
a step of positioning each of the dowels that form the tower section relative to the adjacent dowels so as to secure dimensional tolerances of the finished section.

In addition, to ensure the same position as that achieved after the positioning step performed in the area near the base of the tower at ground level, of the remaining dowels of the section that are not part of the subset relative to said subset, or of subsets relative to each other, once stacked, the method comprises, prior to the step of subset stacking and subsequent to the step of positioning each of the dowels that form the tower section:

a step of arranging the elements controlling the relative positioning between dowels in areas of said dowels which are accessible from a tower platform, allowing a step for the control of relative positioning between dowels, step performed subsequent to the step of stacking the section they form and prior to stacking the section immediately above. Thus, said positioning control elements are used to identify, prior to stacking, the reference position of the remaining dowels of the section not comprised in the subset relative to said subset, or of the reference position of subsets relative to each other. Following the step of stacking the remaining dowels with the subset or of stacking subsets, the reference position identified by the positioning control elements, allows the performance of the step of controlling the relative positioning between dowels, ensuring that said remaining dowels are positioned relative to the subset according to the reference position identified by the relative positioning elements, i.e., in the same manner as in the area near the base of the tower at ground level, or that the subsets are positioned relative to each other in the same manner as in the area near the base of the tower at ground level.

The method further comprises a step of provisional attachment between subsets or remaining dowels and the lower section of the concrete tower once the step of stacking the assembled subset has been carried out and subsequent to the stage of control of relative positioning between dowels described above.

The provisional attachment step is performed by means of temporary connections that can be executed by a three-point mooring of the surface in contact with the lower surface at the height of the horizontal joint defined between them or by means of struts to the area opposite the lower section.

The method further comprises a step of execution of the permanent connections between subsets, or between subsets and remaining dowels, which takes place once completed the stacking of all subsets and remaining dowels forming each section of concrete tower, which speeds up installation.

PREFERRED EMBODIMENT OF THE INVENTION

Figure 1:
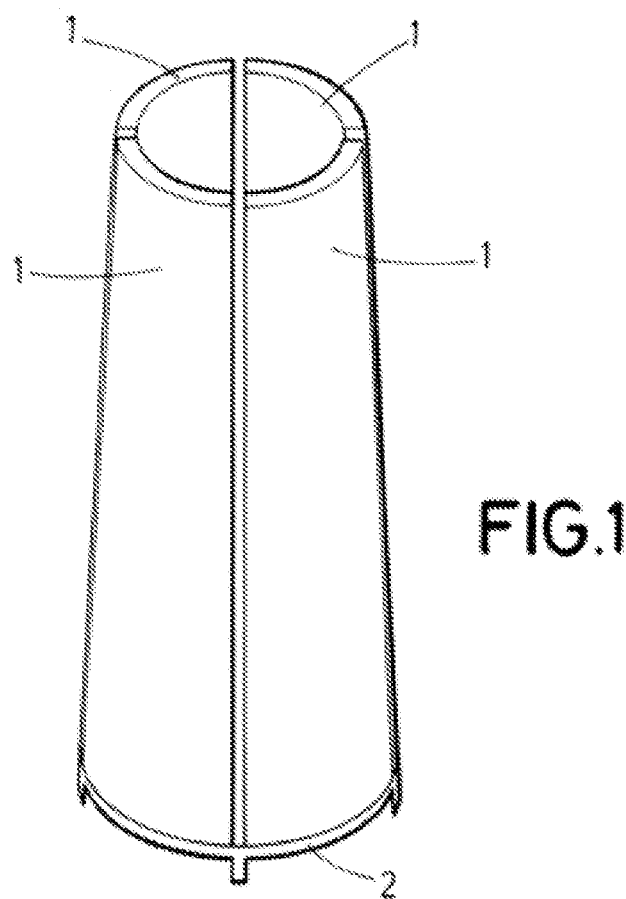
FIG. 1 shows a perspective view of the step of positioning, one at a time, all the dowels that form a tower section in an area near the base of the tower of the method of the present invention according to a first preferred embodiment.

In a preferred embodiment of the invention, the method for the assembly of frustoconical concrete towers comprises the following steps:

a step of pre-assembly base (2, 12) preparation, wherein the horizontality and flatness of said pre-assembly bases (2) are ensured, further ensuring the verticality and taper of the concrete tower;

a step of placing and positioning of at least one subset of a tower section formed by at least two dowels in an area near the base of the tower where in this preferred embodiment all the dowels (1, 11) that form the tower section are placed and positioned one by one onto the pre-assembly bases (2, 12), wherein the placing and positioning step comprises:

a step of placing one by one all the dowels (1, 11) forming the tower section in the area near the base of the tower onto the pre-assembly bases (2, 12) at ground level;

a step of obtaining the verticality and taper of the concrete tower for that section, by using struts or similar means between the dowels (1, 11) and the ground or pre-assembly bases (2, 12), or by means of wedges or similar means between the pre-assembly base (2, 12) and the lower surface of the dowels (1, 11), as sometimes due to imperfections in the concrete, the angle between the side walls and the lower wall of the dowels (1, 11) is not the proper angle; this step in turn comprises a step of certifying tower verticality by means of a system of targets with pointers or plumb lines enabling the correction of the relative positions between dowels (1, 11), and between dowels (1, 11) and pre-assembly bases (2, 12) where necessary;

a step of positioning each of the dowels (1) that form the tower section relative to the adjacent dowels (1) to ensure the dimensional tolerances of the finished section;

a step of arranging control elements (3, 13) to control the relative positioning between dowels (1, 11) in areas of these dowels (1, 11) which may be accessed from tower platforms, wherein said positioning control elements (3, 13) serve to identify the position, prior to stacking, of the reference position of the remaining dowels (11) of the section that is not part of the subset (14) relative to said subset (14), or of the reference position of subsets (4) relative to each other;

a step of assembling a subset (4, 14) of the tower section formed by at least two dowels (1, 11), by joining said dowels (1, 11), such that the subset (4, 14) is freestanding;

The attachment between two dowels (1, 11) may be permanent or provisional.

Figure 2:
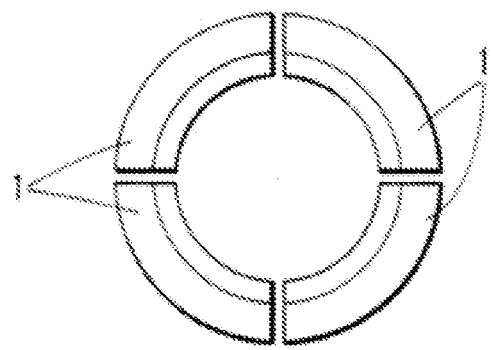
FIG. 2 shows a plan view of the step of positioning each of the dowels that form the tower section relative to the adjacent dowels of the method of the present invention according to a first preferred embodiment.
Figure 3:
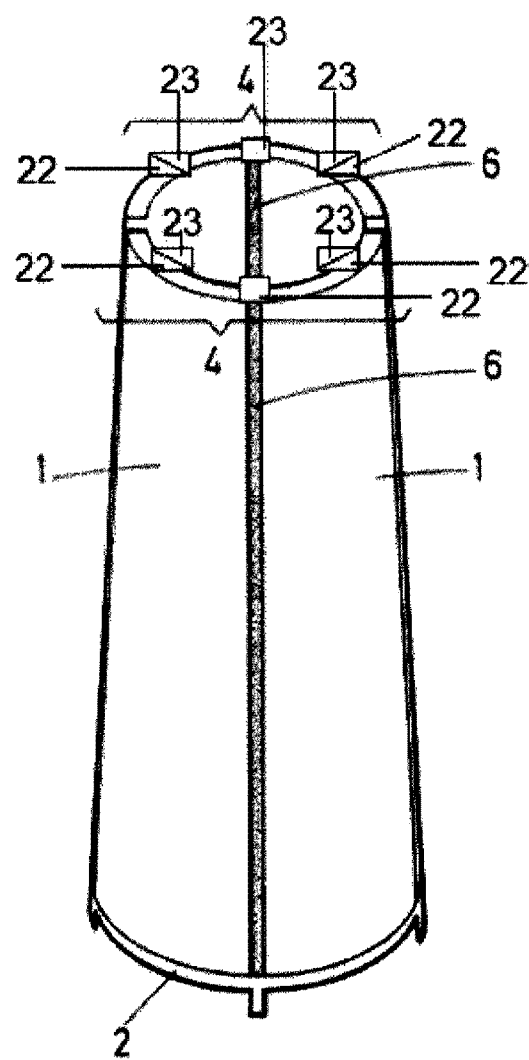
FIG. 3 shows a perspective view of the step of assembling a subset of the tower section formed by at least two adjacent dowels of the method of the present invention according to a first preferred embodiment.
Figure 4:
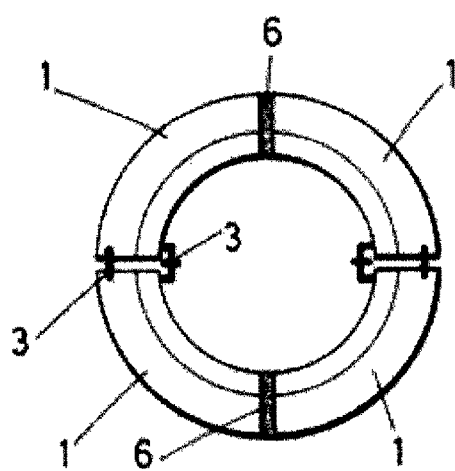
FIG. 4 shows a plan view of FIG. 3.
Figures 5, 6, 7:
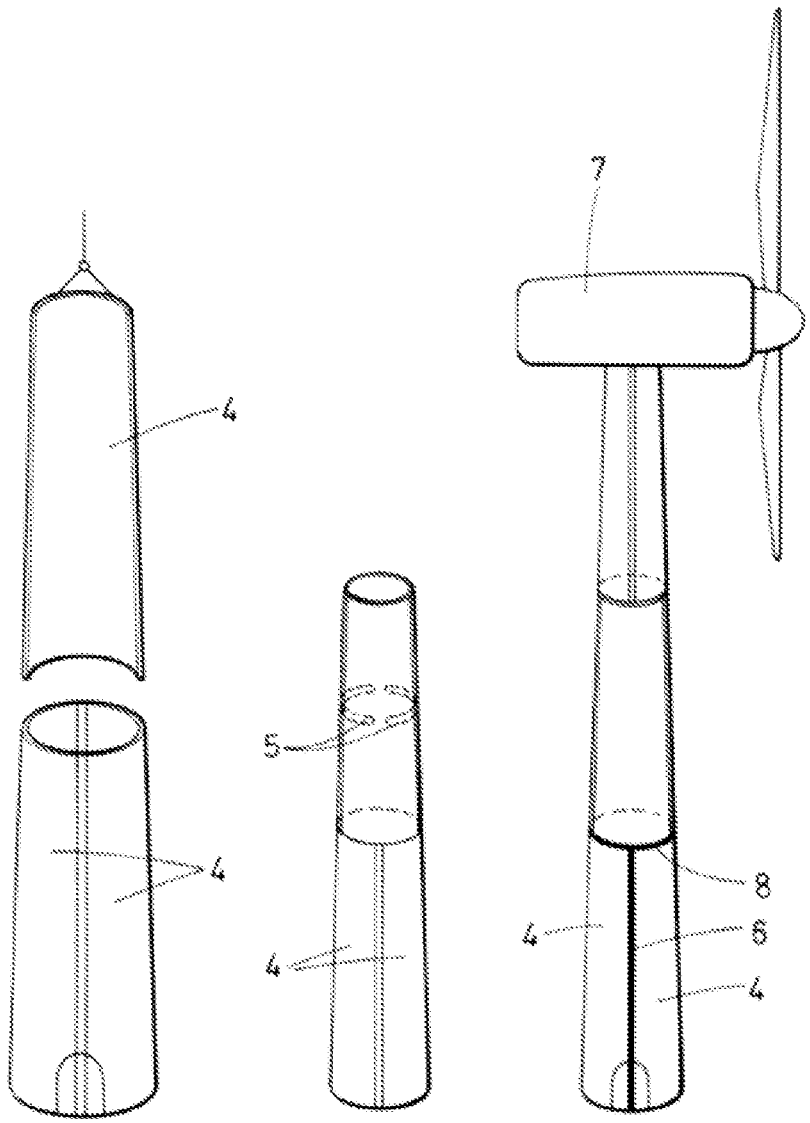
FIG. 5 shows a perspective view of the step of stacking the assembled subset onto an immediately lower tower section of the method of the present invention according to a first preferred embodiment.
FIG. 6 shows a perspective view of the step of attachment performed between the section subsets of the method of the present invention according to a first preferred embodiment.
FIG. 7 shows a perspective view of the step of permanent attachment performed between the subsets of each section of the method of the present invention according to a first preferred embodiment.

If the attachment is permanent (6), according to a first embodiment shown in FIGS. 1 to 7 for a subset (4) formed by at least two adjacent dowels (1), mortar is used for permanent attachment (6) between dowels (1) and it comprises a step of implementing the vertical joints between adjacent dowels (1). For this purpose, formwork is arranged along the vertical sides of the dowels (1) to contain the inner volume and then pour in the mortar.

Figure 8:
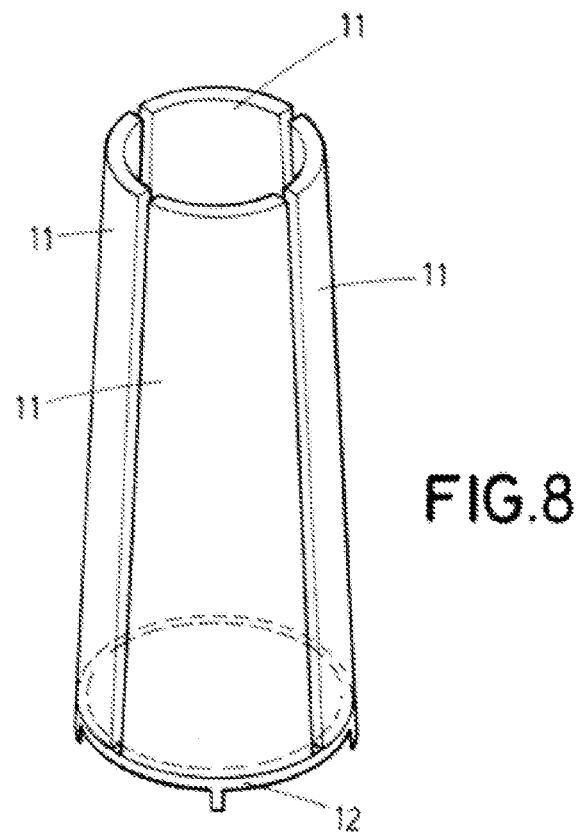
FIG. 8 shows a perspective view of the step of positioning, one at a time, all the dowels that form a tower section in an area near the base of the tower of the method of the present invention according to a second preferred embodiment.
Figure 9:
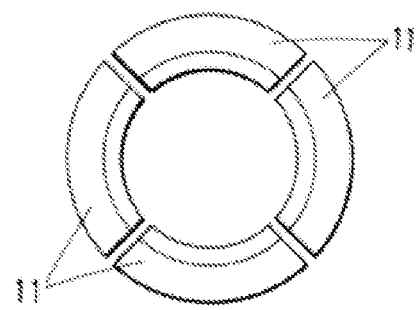
FIG. 9 shows a plan view of the step of positioning each of the dowels that form the tower section relative to the adjacent dowels of the method of the present invention according to a second preferred embodiment.
Figure 10:
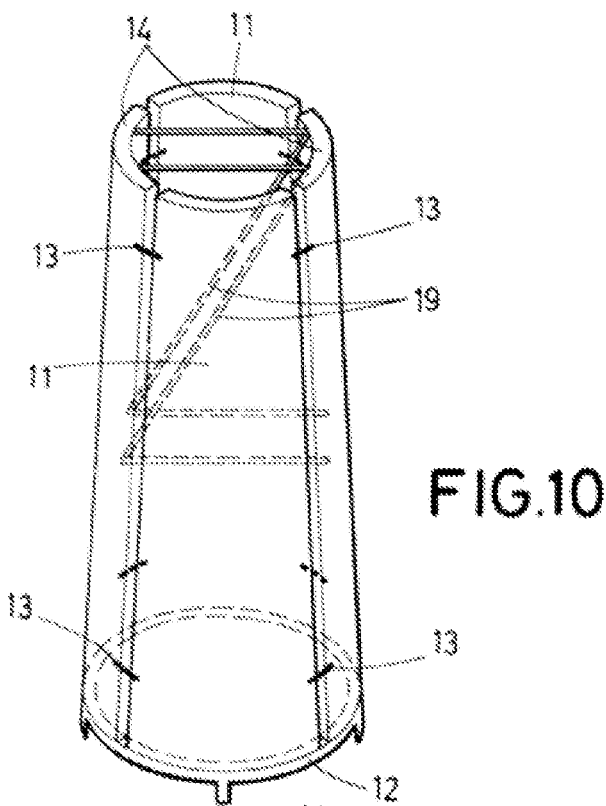
FIG. 10 shows a perspective view of the step of assembling a subset of the tower section formed by at least two diametrically opposite dowels of the method of the present invention according to a second preferred embodiment.
Figure 11:
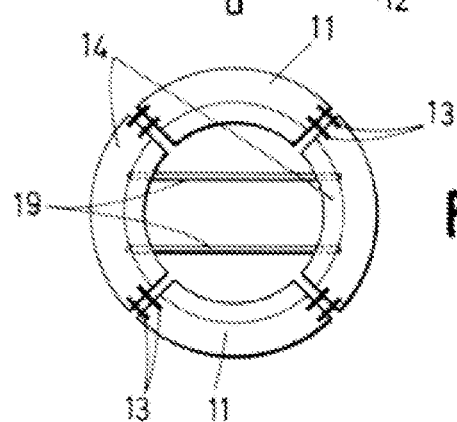
FIG. 11 shows a plan view of FIG. 10.
Figures 12, 13, 14:
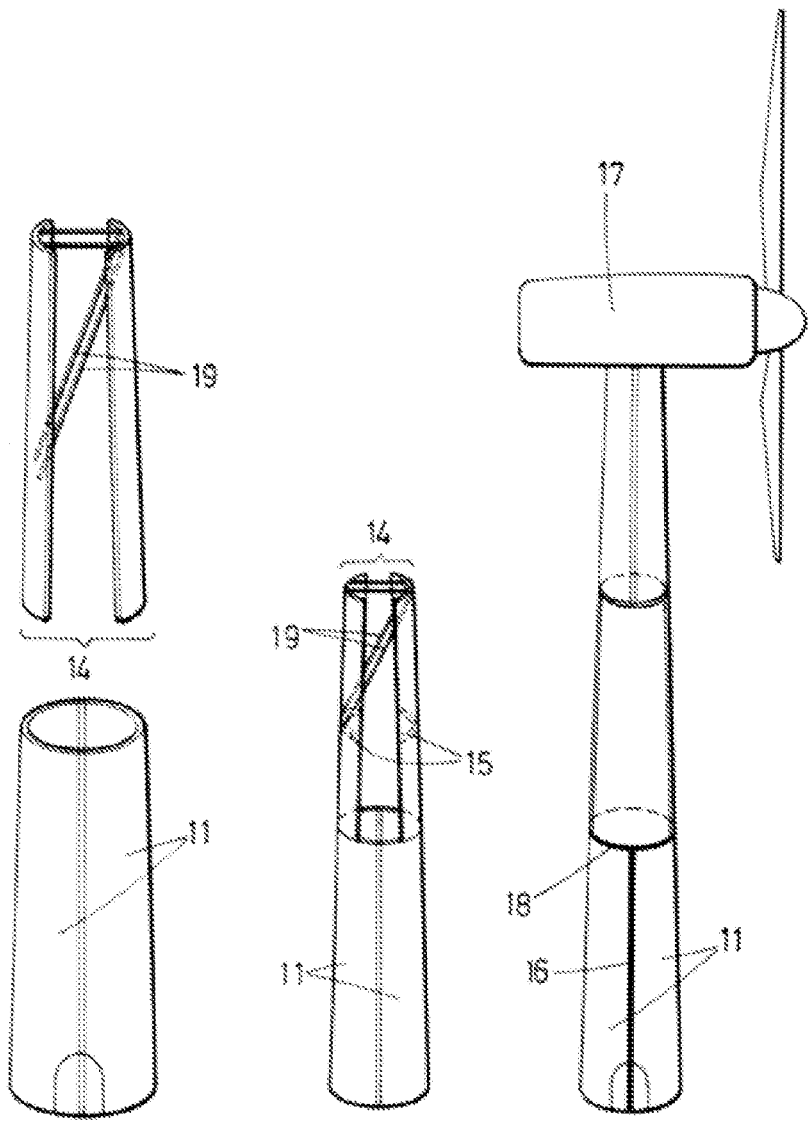
FIG. 12 shows a perspective view of the step of stacking the assembled subset onto an immediately lower tower section of the method of the present invention according to a second preferred embodiment.
FIG. 13 shows a perspective view of the step of attachment between the subset and the remaining dowels of the section of the method of the present invention according to a second preferred embodiment.
FIG. 14 shows a perspective view of the step of permanent attachment performed between subsets and remaining dowels of each section of the method of the present invention according to a second preferred embodiment.
Figure 15:
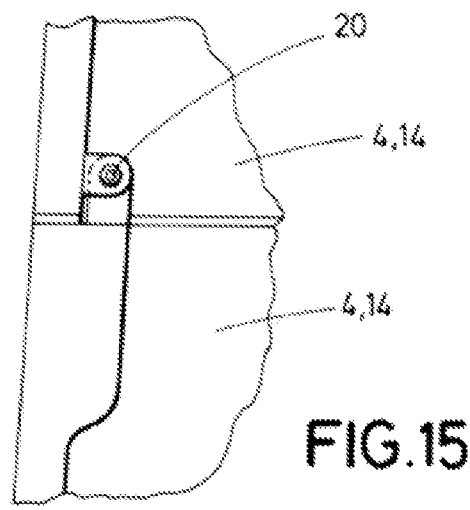
FIG. 15 shows an exploded view of the provisional attachments executed by three-point mooring of the surface in contact with the lower surface at the height of the horizontal joint defined between them of the step of provisional attachment between an upper section and a lower section.
Figure 16:
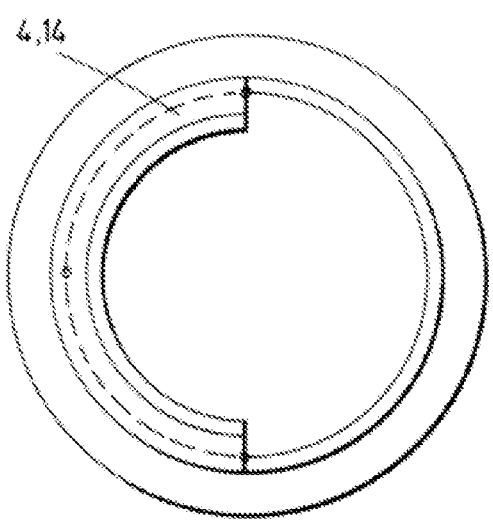
FIG. 16 shows a plan view of FIG. 15.
Figure 17:
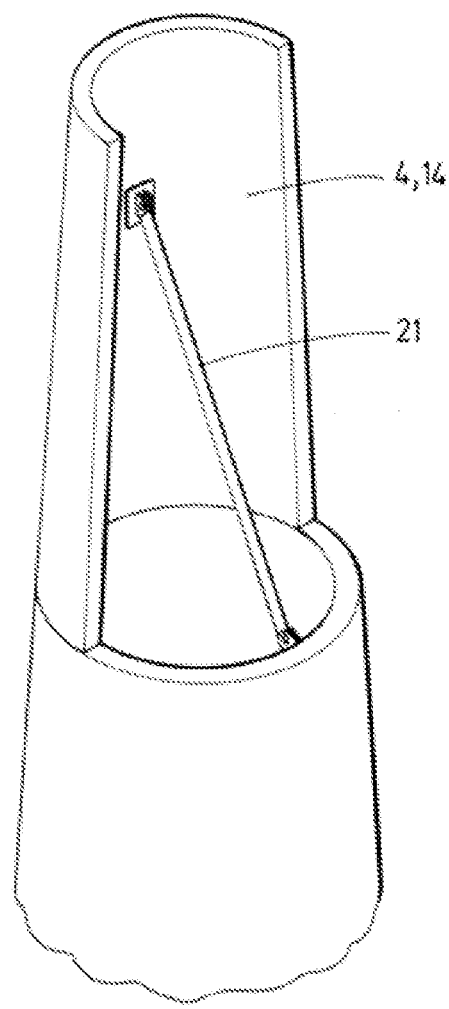
FIG. 17 shows a perspective view of the struts taken to the opposite side of the lower section used in the step a provisional connection between an upper section and a lower section.

If the attachment is provisional, according to a second preferred embodiment shown in FIGS. 8 to 14 for a subset (14) formed by at least two dowels (11) diametrically opposite each other, the attachment of said dowels (11) is carried out by provisional attachment means (19) to provide rigidity and stability to the subset (14). The provisional attachment means (19) between dowels (11) diametrically opposite each other is performed by means of beams or girders restricting relative movement between dowels (11).

a step of stacking the assembled subset (4, 14) onto an immediately lower tower section, comprising a step of positioning the subset (4, 14) at height.

Because, due to manufacturing tolerances, there may be differences between dowels (1, 11), the resulting upper surface is not always flat or horizontal. In a preferred embodiment, the step of positioning the subset (4, 14) at height is performed by conducting a replica of the horizontal surface of the pre-assembly base (2, 12) on the upper surface of the immediately lower tower section prior to the step of stacking the assembled subset (4, 14), by means of shims (22) placed in three points per subset (4, 14) and/or dowel (1, 11), at predetermined angular positions which are the same for all sections, wherein said shims (22) are fixed to the dowels (1, 11), wherein verticality control wedges (23) are placed in those same angular positions where the shims (22) are placed. Therefore, the sum of the horizontal surface defined by the shims (22) and that of the wedges (23) makes it possible to replicate the position achieved in the pre-assembly base (2, 12), once subsets (4, 14) have been stacked.

Alternatively, when the subset (4, 14) is stacked, a check is made to verify that the centre of the subset (4, 14) coincides with the vertical axis of the tower, otherwise it is adjusted to match. Subsequently, the other subset (4) is stacked, for the case of two subsets (4) per section, or the remaining dowels (11), and the following step to control relative positioning between dowels is implemented:

a step of controlling the relative positioning between dowels subsequent to the step of stacking the section they form and prior to stacking the section immediately above by means of positioning control elements (3, 13) arranged in the step of arrangement of the control elements (3, 13) to control the relative positioning between dowels (1, 11) ensuring that the remaining dowels (11) of the section are positioned relative to the subset (14) according to the reference position identified by the relative positioning control elements (3, 13), i.e., in the same manner as in the positioning bases (2, 12), or that the subsets (4) are positioned relative to each other in the same manner as in the positioning bases (2).

The first of the subsets (4, 14) to be stacked will be the one incorporating a flight of steps required to access the upper part of the subset (4, 14) and thereby allow removal of the hook from a crane used to lift said subset (4, 14).

The steps of assembling and stacking the assembled subset (4) are repeated as many times for each of the sections forming the concrete tower, as number of subsets (4) in the section in the event that this section is formed by subsets (4) in which permanent attachment (6) has been carried out between dowels (1) prior to stacking, as shown in FIGS. 1 to 7, whereas for the case of a subset (14) formed by at least two diametrically opposite dowels (11), it is necessary to perform a step of stacking of each of the remaining dowels (11) of the section which are not part of the subset (14) assembled on the tower section immediately below.

Subsequent to the step of stacking each of the subsets (4) of the section, the method comprises a step of attachment performed between the section subsets (4), for the embodiment shown in FIGS. 1 to 7, or between the subset (14) and the remaining dowels (11) section by arranging provisional attachment elements (5, 15), so as to provide the section with additional stability at least until carrying out the step of stacking the assembled subsets (4), or subsets (14) and remaining dowels (11) of a section immediately above.

Such provisional attachment elements (5, 15) between subsets (4), or subsets (14) and remaining dowels (11) may include lugs and hydraulic jacks arranged in accessible areas of the subsets (4), or of the subsets (14) and the remaining dowels (11), at least one in the upper area of the section such that it is accessible from the top.

Subsequent to the step of attachment performed between the subset (14) of the section and the remaining dowels (11) of the section by arranging provisional attachment elements (15) for the embodiment shown in FIGS. 8 to 14, the method comprises a step of removing the provisional attachment means (19) between the dowels (11) of the subset (14).

The method further comprises a step of executing permanent attachments (6, 16) between subsets (4), or between subsets (14) and remaining dowels (11), which are performed once all subsets (4, 14) and dowels (11) which form all the sections of the concrete tower have been stacked and ensuring the proper positioning between them.

The method further comprises a step of provisional attachment between subsets or remaining dowels and the lower section of the concrete tower once the step of stacking the assembled subset has been carried out.

The provisional attachment step is performed by means of provisional attachments that can be executed by mooring (20) at three points of the surface in contact with the lower surface at the height of the horizontal joint defined between them or with struts (21) taken to the opposite side of the lower section.

Preferably each of the sections is angularly staggered with respect to the lower section so that the permanent attachments (6, 16) do not run in a continuous line along the tower, improving the stability thereof.

Said step of executing the permanent attachments (6, 16) between subsets (4), or between subsets (14) and remaining dowels (11), comprises a step of performing vertical concrete joints. In order that the mortar used in the vertical concrete joints is confined within an enclosed cavity, pre-assembled sealant elements or inflatable elements are placed along the vertical concrete joints as a formwork.

In turn, so that the mortar does not flow towards the horizontal joint between the sections, covers which inferiorly seal the vertical joints are arranged prior to the assembly of the upper section.

Preferably, the step of executing the permanent attachments (6, 16) between subsets (4), or between subsets (14) and remaining dowels (11) is performed once a nacelle (7) of the wind turbine has been mounted.

Preferably, the method further comprises a step of executing permanent attachments (8, 18) between adjacent sections, which is performed subsequent to the step of executing permanent attachments (6, 16) between subsets (4), or between subsets (14) and the remaining dowels (11), and more preferably, the step of executing the permanent attachments (8, 18) between adjacent sections is carried out from the highest section to the lowest section of the tower, wherein this step of execution of a permanent attachments (8, 18) between adjacent sections comprises a step of performing horizontal concrete joints.

The invention claimed is:

1. A method for the assembly of frustoconical concrete towers comprising the following steps:
   a step of placing and positioning of at least one subset of a tower section formed by at least two dowels in an area on or adjacent to a base of a tower;
   a step of assembling the at least one subset of a tower section by joining at least two dowels, such that an assembled subset is freestanding; and
   a step of stacking the assembled subset onto an immediately lower tower section.

2. The method of claim 1 wherein the step of placing and positioning of at least one subset of a tower section comprises the following steps prior to the step of assembling the at least one subset:
   a step of placing one by one all dowels of the at least two dowels forming the tower section in the area on or adjacent the base of the tower at ground level;
   a step of positioning each one of all dowels forming the tower section in relation to adjacent dowels in a manner that dimensional tolerances of the tower section ensures that it is possible to carry out the step of stacking the assembled subset onto an immediately lower tower section.

3. The method of claim 2 further comprising, prior to the step of stacking the assembled subset and subsequent to the step of positioning each one of all dowels that form the tower section:
   a step of arranging control elements to control a relative positioning between each one of all dowels in areas of each one of all dowels accessible from tower platforms.

4. The method of claim 3 wherein the step of arranging control elements to control the relative positioning between dowels performs identification, prior to stacking, of a reference position of remaining dowels of the tower section that are not part of the at least one subset relative to the at least one subset or of the reference position of at least two subsets relative to each other of the at least two subsets.

5. The method of claim 4 further comprising a step to control the relative positioning between dowels subsequent to the step of stacking the tower section that the dowels of the at least two dowels form and prior to stacking a tower section immediately above, wherein it is ensured that the remaining dowels of the tower section are positioned relative to the at least one subset according to the reference position identified by the elements to control the relative positioning, in a manner as in the area on or adjacent to the base of the tower at ground level, or that the at least two subsets are positioned relative to each other in the same manner as in the in the area on or adjacent to the base of the tower at ground level.

6. The method of claim 2 wherein the area on or adjacent the base of the tower, pre-assembly bases are provided, wherein the step of placing and positioning of at least one subset of a tower section formed by at least two dowels is carried out and wherein the method comprises:
   a step of preparing the pre-assembly bases where horizontality and flatness of such pre-assembly bases are ensured and which further allows to ensure verticality and taper of the tower prior to the step of placing one by one all dowels forming the tower section on the pre-assembly bases.

7. The method of claim 2 wherein the step of placing and positioning of at least one subset of a tower section, comprises, between the step of placing one by one all dowels and the step of positioning each of the dowels:
   a step of obtaining verticality and taper of the tower regarding the tower section, which in turn comprises a step of certifying the verticality of the tower which allows correction of relative positions between the dowels, and between the dowels and pre-assembly bases.

8. The method of claim 1 wherein the step of stacking the assembled subset onto an immediately lower tower section comprises a step of positioning the at least one subset at a height.

9. The method of claim 8 wherein the step of positioning the at least one subset at a height is performed by replicating a horizontal surface of the pre-assembly base on an upper surface of an immediately lower tower section prior to the step of stacking the assembled subset, by means of shims placed in three points per subset and/or dowel in predetermined angular positions which are the same for all sections.

10. The method of claim 9 wherein in the predetermined angular positions where the shims are placed, wedges to control verticality are placed, so that a sum of the horizontal surface defined by the shims plus the horizontal surface of the wedges will make it possible to replicate a position achieved in the pre-assembly base, once at least two subsets are stacked.

11. The method of claim 8 wherein the step of stacking the assembled subset onto an immediately lower tower section comprises a step of checking a centre position of the subset to ensure its coincidence with a vertical axis of the tower or otherwise adjusting the centre position of the subset to match the vertical axis of the tower.

12. The method of claim 11 wherein subsequently, another subset or remaining dowels of the tower section are stacked, and are again positioned by means of the step to control a relative positioning between dowels until relative positioning control elements give a position achieved in the pre-assembly bases.

13. The method of claim 12 wherein subsequent to the step of stacking for each of the at least one subset of the tower section, the method comprises a step of attachment between at least two subsets of the tower section or between the at least one subset and the remaining dowels of the tower section by arranging provisional attachment elements, so that the tower section is provided with additional stability at least until the step of stacking of the at least two subsets or of the at least one subset and the remaining dowels of a tower section immediately above has been performed.

14. The method of claim 13, further comprising a step of executing permanent attachments between the at least two subsets, or between the at least one subset and the remaining dowels, which is performed once completed the stacking of the assembled subset and the remaining dowels forming each tower section.

15. The method of claim 14 wherein the step of executing permanent attachments between the at least two subsets, or between the at least one subset and the remaining dowels comprises a step of performing vertical concrete joints.

16. The method of claim 14 wherein the step of executing the permanent attachments between the at least two subsets, or between the at least one subset and the remaining dowels is performed once a nacelle of a wind turbine has been mounted.

17. The method of claim 16 further comprising a step of executing permanent attachments between adjacent sections performed subsequent to the step of executing permanent attachments between the at least two subsets or between the at least one subset and the remaining dowels.

18. The method of claim 1 wherein the step of assembling the at least one subset of the tower section by attaching at least two dowels, such that the assembled subset is free-standing, is accomplished by attaching two adjacent dowels.

19. The method of claim 1 wherein the step of assembling the at least one subset of the tower section by attaching at least two dowels, such that the assembled subset is free-standing, is accomplished by attaching two diametrically opposed dowels.

20. The method of claim 1 further comprising a step of stacking at least a remaining dowel or at least another assembled subset onto an immediately lower tower section to form the tower section, wherein the tower section is formed by at least one assembled subset and at least a remaining dowel to complete the tower section or by at least two assembled subsets respectively, wherein the step of stacking at least a remaining dowel or at least another assembled subset is subsequent to the step of stacking the assembled subset onto an immediately lower tower section.

* * * * *